US007978585B2

(12) United States Patent
Nagata et al.

(10) Patent No.: US 7,978,585 B2
(45) Date of Patent: Jul. 12, 2011

(54) ABERRATION CORRECTING DEVICE, OPTICAL HEAD, AND OPTICAL DISC APPARATUS

(75) Inventors: Kazuhiro Nagata, Yokohama (JP); Katsuo Iwata, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/493,007

(22) Filed: Jun. 26, 2009

(65) Prior Publication Data
US 2010/0027385 A1 Feb. 4, 2010

(30) Foreign Application Priority Data

Jul. 31, 2008 (JP) ................................. 2008-198775

(51) Int. Cl.
*G11B 7/135* (2006.01)
(52) U.S. Cl. ................. 369/112.02; 369/44.23
(58) Field of Classification Search .................. None
See application file for complete search history.

(56) References Cited

U.S. PATENT DOCUMENTS

| | | | | |
|---|---|---|---|---|
| 5,644,420 A * | 7/1997 | Nakane | ......................... | 359/245 |
| 5,936,923 A * | 8/1999 | Ootaki et al. | ............... | 369/53.19 |
| 6,137,752 A * | 10/2000 | Sakai | ......................... | 369/44.23 |
| 6,151,154 A * | 11/2000 | Ogasawara et al. | ............ | 359/279 |
| 6,449,236 B2 * | 9/2002 | Wals et al. | ................. | 369/112.02 |
| 6,532,202 B1 * | 3/2003 | Wada et al. | ................. | 369/112.02 |
| 7,068,572 B2 * | 6/2006 | Ariyoshi et al. | ............. | 369/44.42 |
| 7,164,521 B2 * | 1/2007 | Sakai | ............................. | 359/279 |
| 7,428,193 B2 * | 9/2008 | Ogasawara | ................. | 369/44.23 |
| 7,428,207 B2 * | 9/2008 | Sato et al. | ................. | 369/112.02 |
| 2004/0264347 A1 * | 12/2004 | Wada et al. | ............... | 369/112.02 |
| 2005/0083824 A1 * | 4/2005 | Ogasawara | ............... | 369/112.02 |
| 2005/0259553 A1 * | 11/2005 | Katayama | ................. | 369/112.02 |
| 2006/0012846 A1 * | 1/2006 | Sakai | ............................. | 359/279 |
| 2006/0067196 A1 * | 3/2006 | Tanimoto et al. | ......... | 369/112.01 |
| 2007/0115767 A1 * | 5/2007 | Nagatomi et al. | ......... | 369/44.23 |
| 2009/0115921 A1 * | 5/2009 | Fujinoki et al. | .................. | 349/2 |
| 2009/0167965 A1 * | 7/2009 | Naka et al. | ......................... | 349/1 |
| 2009/0252011 A1 * | 10/2009 | Katayama | .................. | 369/53.25 |
| 2010/0027385 A1 * | 2/2010 | Nagata et al. | ............... | 369/44.32 |

FOREIGN PATENT DOCUMENTS

JP 2005-122828 A 5/2005

(Continued)

OTHER PUBLICATIONS

Notification of Reasons for Refusal mailed by Japan Patent Office on Sep. 15, 2009 in the corresponding Japanese patent application No. 2008-198775.

(Continued)

*Primary Examiner* — Peter Vincent Agustin
(74) *Attorney, Agent, or Firm* — Knobbe, Martens, Olson & Bear, LLP

(57) ABSTRACT

An aberration correcting device includes: a first transparent electrode; a second transparent electrode; and a liquid crystal layer disposed between the first transparent electrode and the second transparent electrode, having refractive index varying according to an electric field applied to the liquid crystal layer, wherein the first transparent electrode has a first circular dividing line and a second circular dividing line formed outside the first circular division line arranged to be concentric with the second circular dividing line, and wherein a region between the first circular dividing line and the second circular dividing line is radially divided by plural radial dividing lines.

3 Claims, 9 Drawing Sheets

FOREIGN PATENT DOCUMENTS

| | | |
|---|---|---|
| JP | 2006-031829 | 2/2006 |
| JP | 2006-120297 | 5/2006 |
| JP | 2006-228273 | 8/2006 |
| JP | 2007-164821 | 6/2007 |
| JP | 2007-257676 | 10/2007 |
| JP | 2007-273045 | 10/2007 |
| WO | WO 2007/055196 A1 | 5/2007 |
| WO | WO 2007/091488 A1 | 8/2007 |

OTHER PUBLICATIONS

Notification of Reasons for Refusal mailed by Japan Patent Office on Dec. 8, 2009 in the corresponding Japanese patent application No. 2008-198775.

* cited by examiner

ABERRATION CORRECTING DEVICE, OPTICAL HEAD, AND OPTICAL DISC APPARATUS

CROSS-REFERENCE TO RELATED APPLICATIONS

This application is based upon and claims the benefit of priority from Japanese Patent Application No. 2008-198775, filed Jul. 31, 2008, the entire contents of which are incorporated herein by reference.

BACKGROUND

1. Field

The present invention relates to an aberration correcting device as well as an optical head and an optical disc apparatus using the aberration correcting device.

2. Description of the Related Art

Optical discs having plural kinds of recording densities such as ones that conform to the CD (compact disc) standard or the DVD (digital versatile disk) standard have spread widely. In recent years, ultrahigh-density optical discs have been put into practical use that comply with the BD (Blu-ray disc) standard or the HD DVD (high definition digital versatile disk) standard and are further increased in recording density by recording information using blue-violet laser light.

Among optical disc apparatus which record information on an optical disc and reproducing information recorded on an optical disc are ones that employ an aberration correcting device for correcting aberrations such as coma, spherical aberration, and astigmatism that are caused by inclination of an optical disc, variation in the thickness (i.e., the distance between the outside surface and the recording layer) of an optical disc, assembling errors of optical elements and an optical head, and other factors.

For example, the DVD standard prescribes a two-layer-recording-type optical disc in which the distances between the outside surface and the first recording layer and the second recording layer of the optical disc are different from each other by about 55 µm. Therefore, a factor in causing spherical aberration, which is more essential than thickness variation of the optical disc, is inherent in the two-layer-recording-type optical disc. Coma is caused by inclination of the recording surface of an optical disk from the optical axis of an objective lens and has a component due to inclination in the tangential direction (tangential to the track of the optical disk) and a component due to inclination in the radial direction (of the optical disc).

An aberration correcting device using a liquid crystal is equipped with liquid crystal layers, glass substrates that are disposed in such a manner that the liquid crystal layers are sandwiched between them, and transparent electrodes for applying electric fields to the liquid crystal layers. Each transparent electrode is formed on that surface of the associated glass substrate which is in contact with the liquid crystal layer. Each transparent electrode is divided into plural patterns according to an aberration distribution(s). Where the number of liquid crystal layers is n (n: natural number), the number of surfaces of the transparent electrodes is 2n and the number of glass substrates is n+1. In the minimum configuration, the number of liquid crystal layers is 1, the number of surfaces of the transparent electrodes is 2, and the number of glass substrates is 2.

As the number of liquid crystal layers and the number of surfaces of the transparent electrodes increase, the number of glass substrates increases, resulting in increase in the thickness and the weight of the liquid crystal device. A thick liquid crystal device narrows the arrangement space of high-density-integrated components in an optical head, which is a factor in lowering the degree of freedom of the optical head designing. For this reason, it is desired to correct aberrations efficiently by a liquid crystal device having the above-described minimum configuration.

For example, a method has been invented in which one transparent electrode surface corrects coma in the radial direction of an optical disc and the other transparent electrode surface corrects coma in the tangential direction of the optical disc and astigmatism. The transparent electrode of the latter transparent electrode surface which corrects the coma in the tangential direction and the astigmatism may be patterned in such a manner that a central portion of the transparent electrode surface corrects the coma in the tangential direction and an outer peripheral portion corrects the astigmatism (refer to JP-A-2005-122828, for example).

For example, in the divisional patterns of the transparent electrode of JP-A-2005-122828, the pattern of the outer peripheral portion for correcting the astigmatism is not compatible with a distribution pattern of a peripheral portion of the coma in an effective range of a light beam and hence does not exhibit sufficient aberration reducing performance for the correction of the peripheral portion of the coma. Furthermore, the coma has a component in the radial direction of an optical disc and a component in the tangential direction which is perpendicular to the radial direction. This raises a disadvantage that, for example, the coma in the tangential direction cannot be corrected with high accuracy when the divisional patterns are such as to correct the coma in the radial direction.

On the other hand, one method for correcting coma and astigmatism with high accuracy with a single transparent electrode surface is to increase the number of divisional electrodes of the transparent electrode according to aberration distributions. However, although the aberration correction performance is improved by increasing the number of divisional electrodes, the increase in the number of divisional electrodes raises disadvantage that the number of signal lines is increased and a drive circuit is made complex. Therefore, divisional patterns of a transparent electrode are desired which can correct aberrations efficiently with as small a number of divisional electrodes as possible.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, an aberration correcting device includes: a first transparent electrode; a second transparent electrode; and a liquid crystal layer disposed between the first transparent electrode and the second transparent electrode, and having refractive index varying according to an electric field applied to the liquid crystal layer, wherein the first transparent electrode has a first circular dividing line and a second circular dividing line formed outside the first circular division line arranged to be concentric with the second circular dividing line, and wherein a region between the first circular dividing line and the second circular dividing line is radially divided by plural radial dividing lines.

Figure 1:
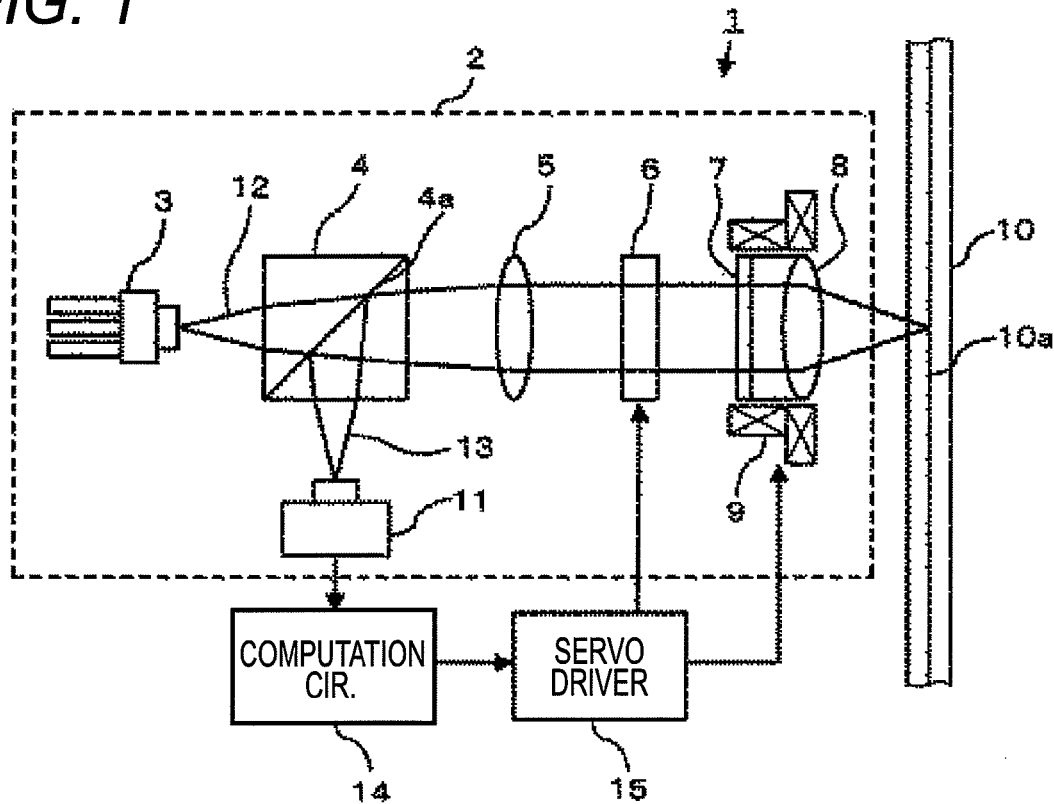
FIG. 1 shows the configuration of an optical disc apparatus according to an embodiment of the present invention.

An embodiment of the present invention will be hereinafter described with reference to the drawings. FIG. 1 shows the configuration of an optical disc apparatus according to the embodiment of the invention. The optical disc apparatus 1 of FIG. 1 is equipped with an optical head 2. The optical head 2 includes a semiconductor laser 3 which outputs laser light 12 having a prescribed wavelength. The wavelength of the laser light 12 emitted from the semiconductor laser 3 is 780 nm, 650 nm, and 405 nm in the cases where an optical disc 10 is of the CD type, the DVD type, and the BD/HD DVD type, respectively.

The laser light 12 emitted from the semiconductor laser 3 is transmitted through a polarizing beam splitter 4, collimated by a collimating lens 5, transmitted through a liquid crystal device 6 and a λ/4 plate/diffraction element 7, and focused on a recording/reproducing surface 10a of the optical disc 10 by an objective lens 8. The optical disc 10 may have multiple recording/reproducing surfaces when it is of the DVD type or the BD/HD DVD type.

After being focused on the recording/reproducing surface 10a of the optical disc 10, the laser light 12 is reflected by the recording/reproducing surface 10a and returned to the objective lens 8 as reflection laser light 13, which is passed through the λ/4 plate/diffraction element 7, he liquid crystal device 6, and the collimating lens 5, and returned to the polarizing beam splitter 4. After being returned to the polarizing beam splitter 4, the reflection laser light 13 is reflected by a reflection surface 4a of the polarizing beam splitter 4 and image-formed on a photodetecting surface of a photodetector 11.

Usually, the photodetecting surface of the photodetector 11 is divided into plural photodetecting regions having prescribed shapes. Currents are output that correspond to light intensity values of light beams detected by the individual photodetecting regions. The currents that are output from the respective photodetecting regions are converted by I/V (current-voltage) converting amplifiers (not shown) into voltage signals, which are subjected to computations of a computation circuit 14 so as to become signals to be used for generation of an RF (reproduction) signal, focusing error signal, a tracking error signal, etc. Although not described in detail, the RF (reproduction) signal is converted into a signal having a prescribed format or output to a temporary storage device, an external storage device, or the like via a prescribed interface.

A signal produced by the computation circuit 14 is supplied to a servo driver 15 and used therein for generating a focusing error signal which serves to vary the position of the objective lens 8 so that a light spot that is formed at the focusing position of the objective lens 8 and has a prescribed size is formed on the recording/reproducing surface 10a of the optical disc 10. The focusing error signal is used for producing a focusing control signal which serves to vary the position of the objective lens 8 with respect to an actuator 9 for varying the position of the objective lens 8. The focusing control signal generated on the basis of the focusing error signal is supplied to the actuator 9. On the basis of the focusing control signal, the actuator 9 moves the objective lens 8 (held movably by the actuator 9) in a desired manner so that it comes closer to or goes away from the recording/reproducing surface 10a of the optical disc 10 (in the right-left direction in FIG. 1).

Another signal produced by the computation circuit 14 is supplied to the servo driver 15 and used therein for generating a tracking error signal which serves to vary the position of the objective lens 8 to guide the light spot of laser light 12 focused at the focusing position of the objective lens 8 so that it is located approximately at the center of a recording mark array recorded on the recording/reproducing surface 10a of the optical disc or a guide groove (i.e., track) formed on the recording/reproducing surface 10a in advance.

The tracking error signal is used for producing a tracking control signal which serves to locate the objective lens 8 at a prescribed position with respect to the actuator 9. The tracking control signal generated on the basis of the tracking error signal is supplied to the actuator 9. Therefore, the objective lens 8, which is held by the actuator 9 movably, is moved in a desired manner in the radial direction of the recording/reproducing surface 10a of the optical disc, that is, in the direction that crosses the track or the recording mark array.

That is, the objective lens 8 is controlled successively by the servo driver 15 so that the size of the light spot that is formed by the objective lens 8 at the track or the recording mark array formed on the recording/reproducing surface 10a of the optical disc 10 is minimized.

Figure 2:
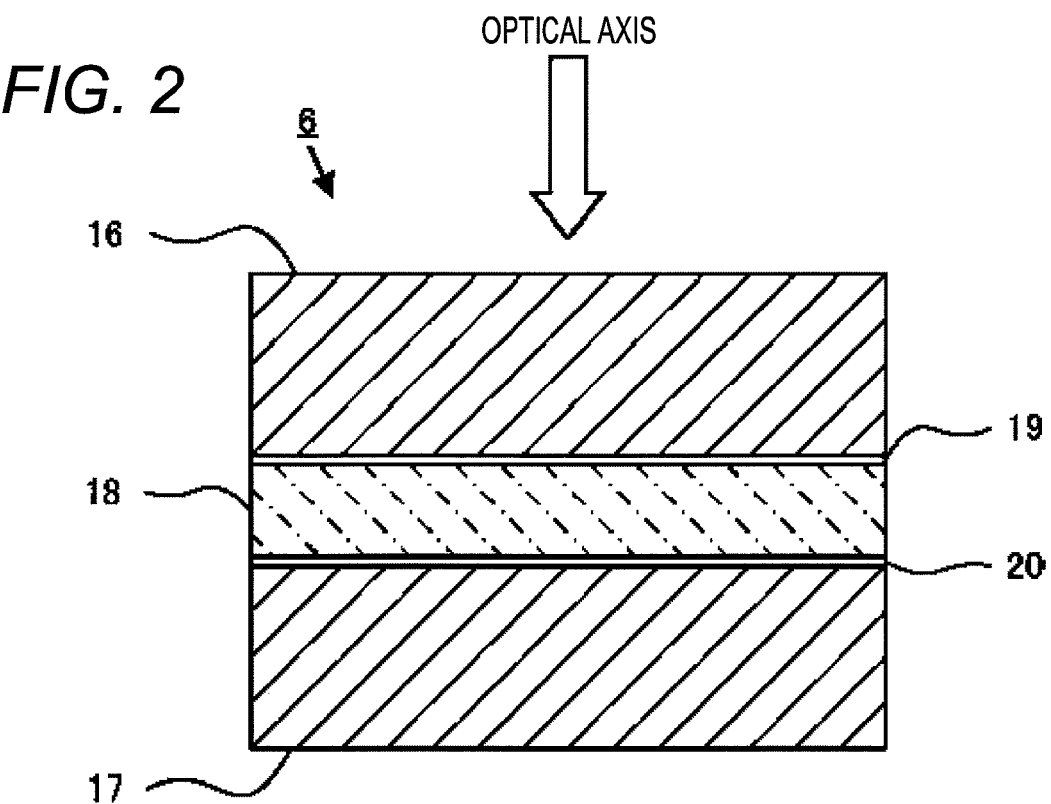
FIG. 2 is an exemplary sectional view of a liquid crystal device.

Next, the liquid crystal device 6 will be described. FIG. 2 is a sectional view of the liquid crystal device 6. A liquid crystal layer 18 containing liquid crystal molecules is sandwiched between glass substrates 16 and 17. A first transparent electrode 19 and a second transparent electrode 20 are formed on the inside surfaces (i.e., the surfaces on the side of the liquid crystal layer 18) of the glass substrate 16 and 17, respectively. The thickness of the glass substrate 16 and 17 is about 0.5 mm and the thickness of the liquid crystal layer 18 is several micrometers to several dozens of micrometers. The total thickness of the liquid crystal device 6 is about 1 mm. Each of the first and second transparent electrodes 19 and 20 is divided into plural regions depending on an aberration distribution(s). The external form of the liquid crystal device 6 may be a square whose sides measure several millimeters, a rectangle that is close to the square, or a circle having approximately the same area as the square. The operation of the liquid crystal device 6 is controlled by the servo driver 15.

To correct three kinds of aberrations, that is, spherical aberration, coma, and astigmatism, at least one transparent electrode needs to correct two of the three kinds of aberrations because there are only two transparent electrodes. In the embodiment, the first transparent electrode 19 has such divisional patterns as to correct spherical aberration and the second transparent electrode 20 has such divisional patterns as to correct coma and astigmatism. An alternative configuration is such that the first transparent electrode 19 corrects coma and astigmatism and the second transparent electrode 20 corrects spherical aberration.

Figure 3:
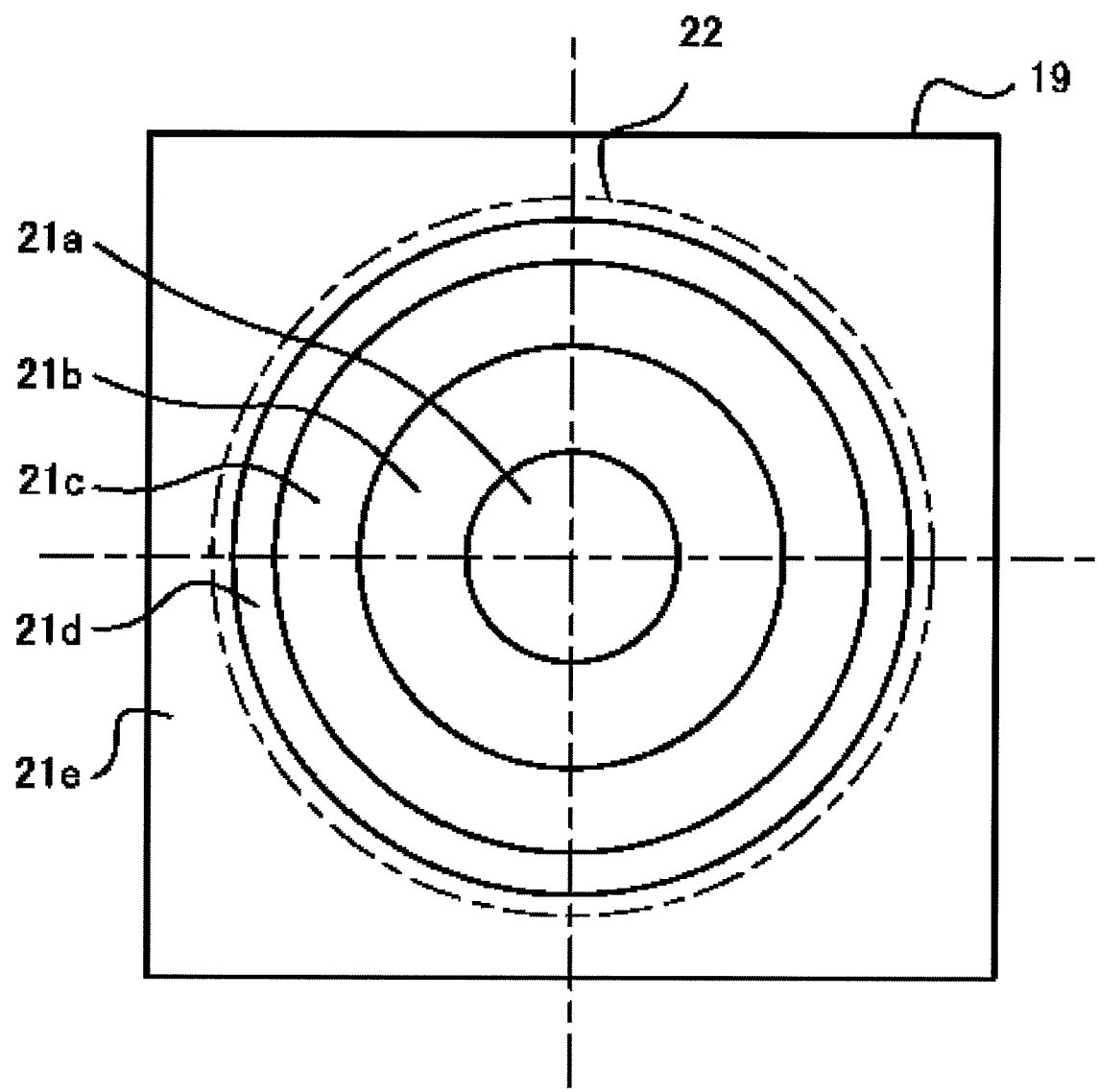
FIG. 3 shows exemplary divisional patterns of a first transparent electrode for correcting spherical aberration.

FIG. 3 shows divisional patterns of the first transparent electrode 19 which corrects spherical aberration. The first transparent electrode 19 is divided into concentric annular regions 21a-21d and an outer peripheral region 21e according to a distribution of spherical aberration. A chain-line circle represents an effective range 22 of the objective lens 8 (light beam effective range). To correct spherical aberration accurately, it is necessary to divide the first transparent electrode 19 into as narrow regions as possible to approximate distribution curves of the spherical aberration. However, this makes the wiring, the drive circuit, etc. complex and hence is costly. In view of this, in the embodiment, the first transparent electrode 19 is divided into the five regions.

Figure 4:
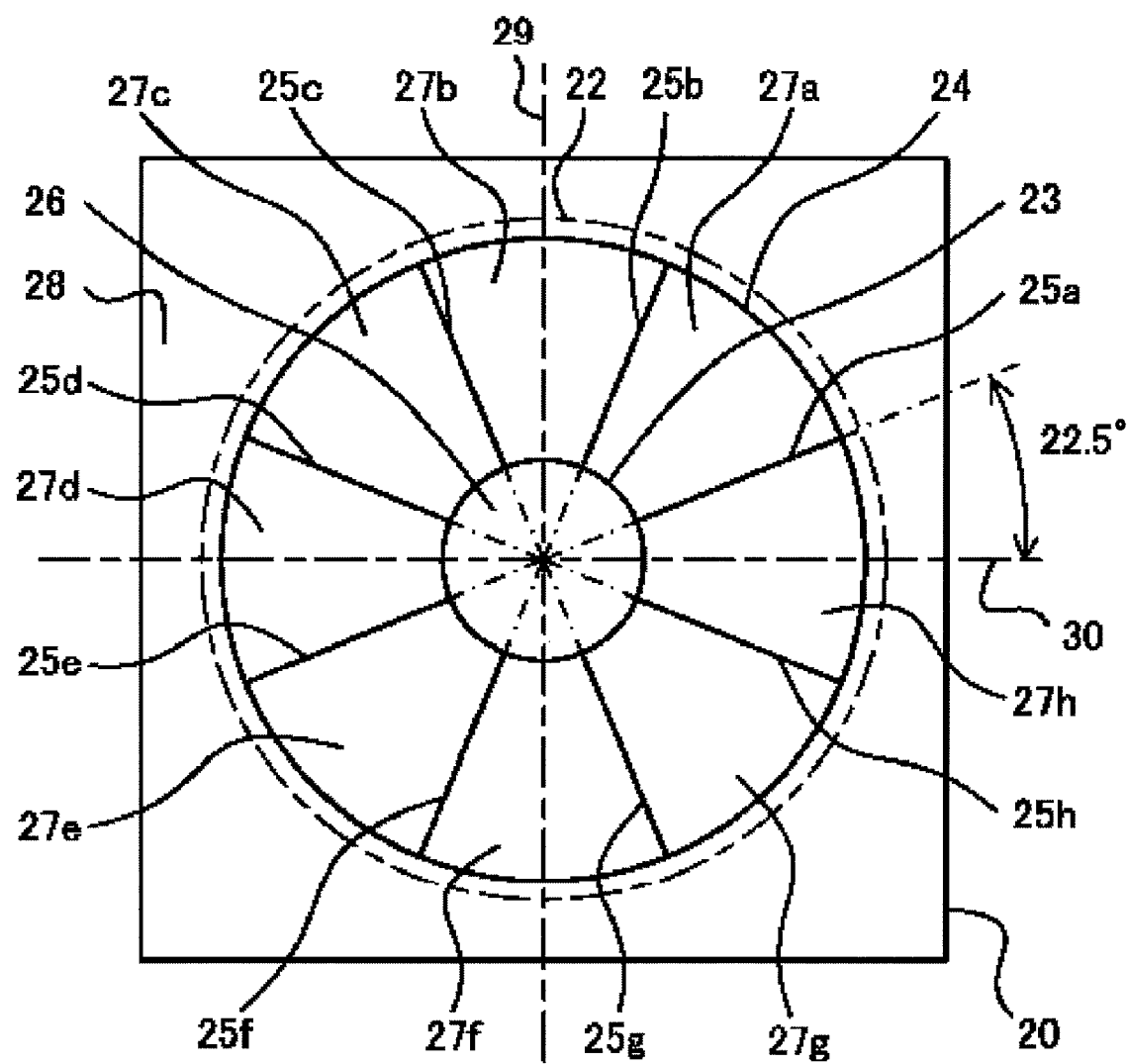
FIG. 4 shows exemplary divisional patterns of a second transparent electrode for correcting coma and astigmatism at the same time.

FIG. 4 shows example divisional patterns of the second transparent electrode 20 for correcting coma and astigmatism at the same time. A first circular division line 23 is located around the center of the second transparent electrode 20. A second circular division line 24 is located outside the first circular division line 23 so as to be concentric with it. The region between the first circular division line 23 and the second circular division line 24 is divided radially by plural division lines that are arranged approximately at regular angular intervals. In the example of FIG. 4, eight division lines 25a-25h are arranged around the center of the first circular division line 23 approximately at regular angular intervals of 45°.

The second transparent electrode 20 is divided by the first circular division line 23, the second circular division line 24, and the division lines 25a-25h into 10 regions, that is, a central circular region 26 which is located inside the first circular division line 23, semi-fan-shaped regions 27a-27h, and an outer peripheral region 28 which is located outside the second circular division line 24.

Among the eight division lines 25a-25h, the one division line 25a is a segment of a straight line that passes through the center of the first circular division line 23 and forms an angle of about 22.5° with a horizontal axis 30. The divisional patterns are kept symmetrical with respect to both of a vertical axis 29 and the horizontal axis 30 even if the second transparent electrode 20 is rotated by about 22.5°.

Figure 5A:
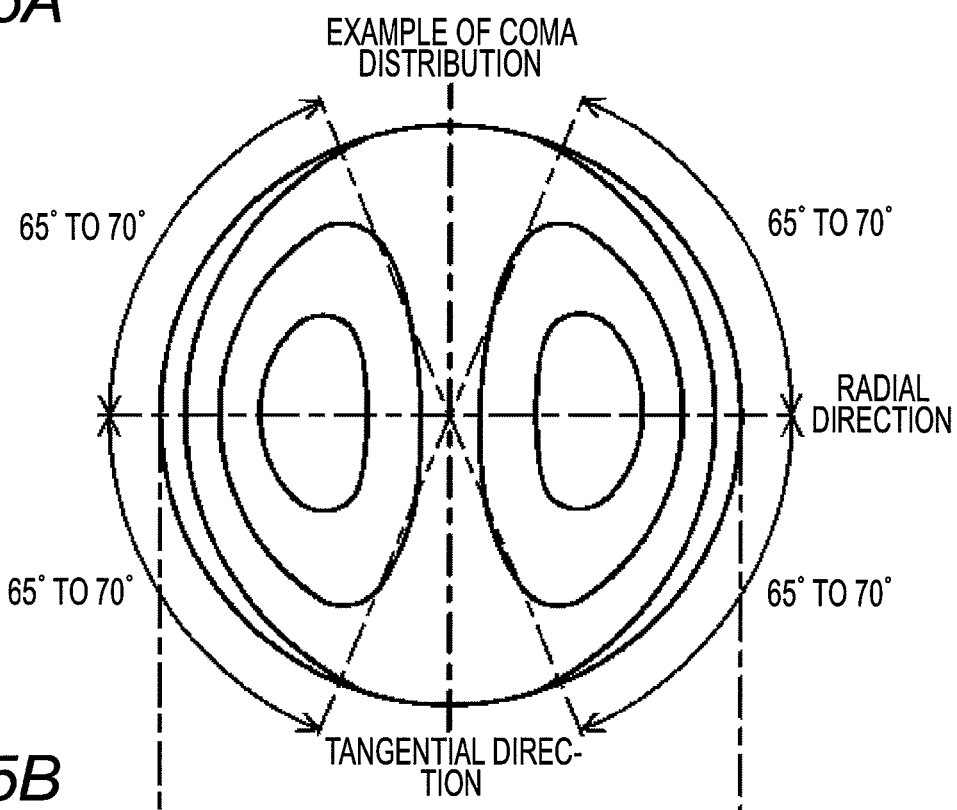
FIGS. 5A and 5B show an example of coma distribution.
Figure 5B:
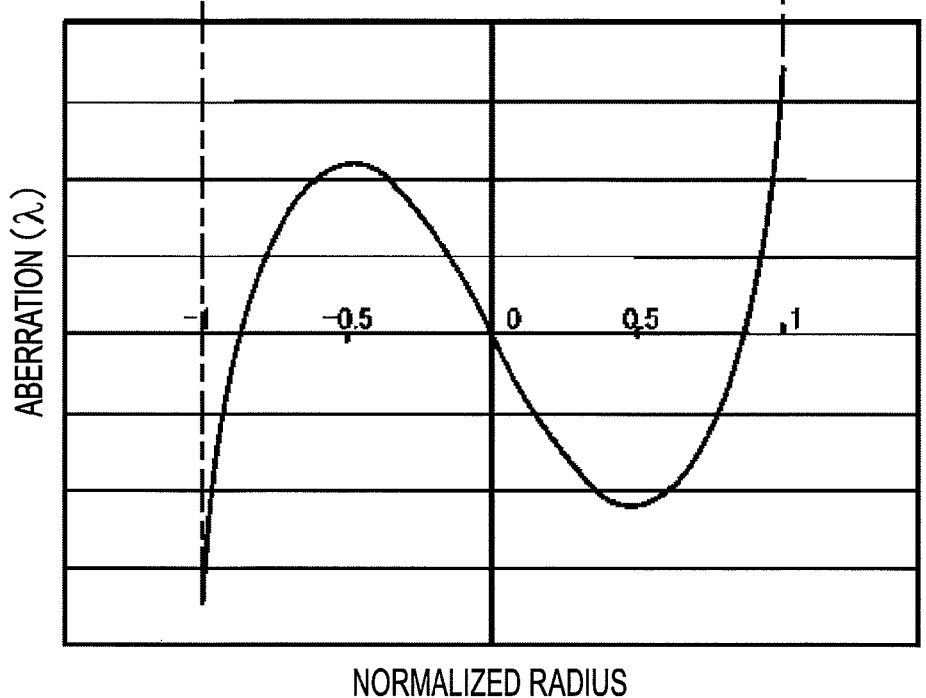

FIGS. 5A and 5B show an example coma distribution. Coma is caused by inclination of the recording/reproducing surface 10a of the optical disc 10 from the optical axis of the objective lens 8, and has a component due to inclination in the tangential direction (tangential to the track of the optical disk 10) and a component due to inclination in the radial direction (of the optical disc 10). FIG. 5A shows a coma distribution corresponding to the effective range of the objective lens 8. FIG. 5B shows a distribution of the magnitude of coma taken along the radial axis in the distribution of FIG. 5A. The coma in the tangential direction exhibits approximately the same distribution. The coma is generally point-symmetrical with respect to the center point on the optical axis and is large and in opposite phases in outer peripheral portions. As shown in FIG. 5A, in many cases, the coma component in the radial direction varies to a large extent in angular ranges (measured from the radial axis) of approximately 65° to 70°. The positions of the divisional patterns of the second transparent electrode 20 can be made suitable for the coma distribution by setting the division line 25a so as to form 22.5° with the horizontal axis.

The divisional patterns of FIG. 4 can correct both of the coma in the tangential direction and the coma in the radial direction that are orthogonal to each other as well as both of the astigmatism in the radial axis direction and the tangential axis direction and the astigmatism in the directions that form 45° with the radial axis and the tangential axis.

Figure 6:
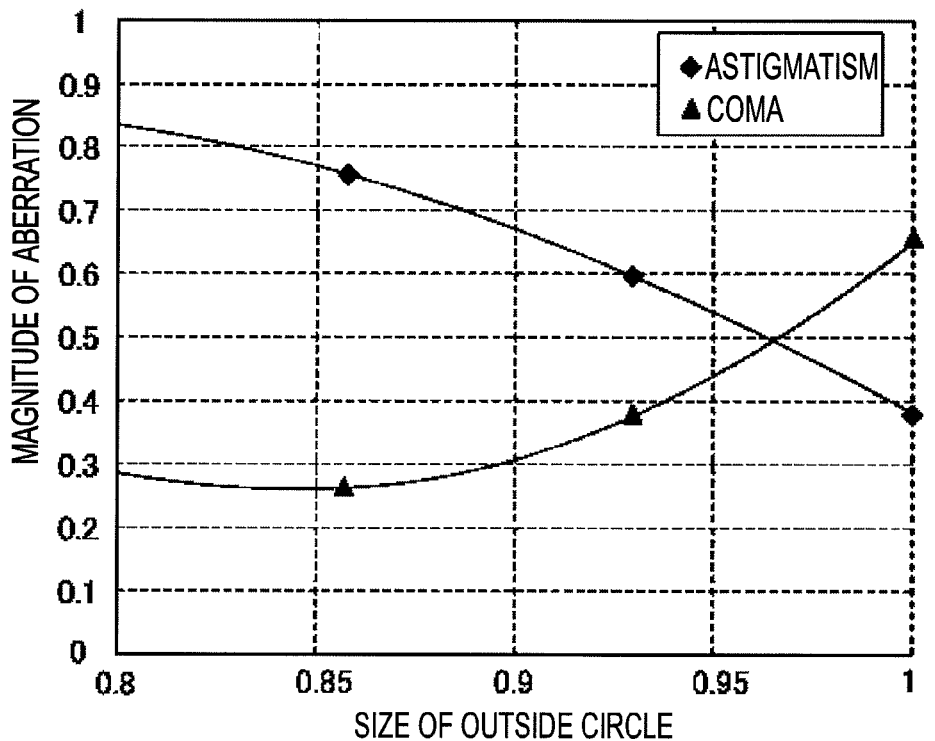
FIG. 6 shows an exemplary relationship between the size of a second circular division line and the magnitude of each of coma and astigmatism.

FIG. 6 shows a relationship between the size of the second circular division line 24 (outside circle) and the magnitude of each of coma and astigmatism. The size of the outside circle is normalized by the diameter of the effective range of a light beam. When the size of the outside circle is around 0.8, the astigmatism is larger than the coma. The relationship between the coma and the astigmatism is revered at an outside circle size of about 0.97. The coma is larger than the astigmatism when the size of the outside circle is equal to 1. As shown in FIG. 6, the coma/astigmatism correction ratio can be made 50:50 by setting the size of the outside circle (second circular division line 24) approximately equal to 0.97.

Figure 7:
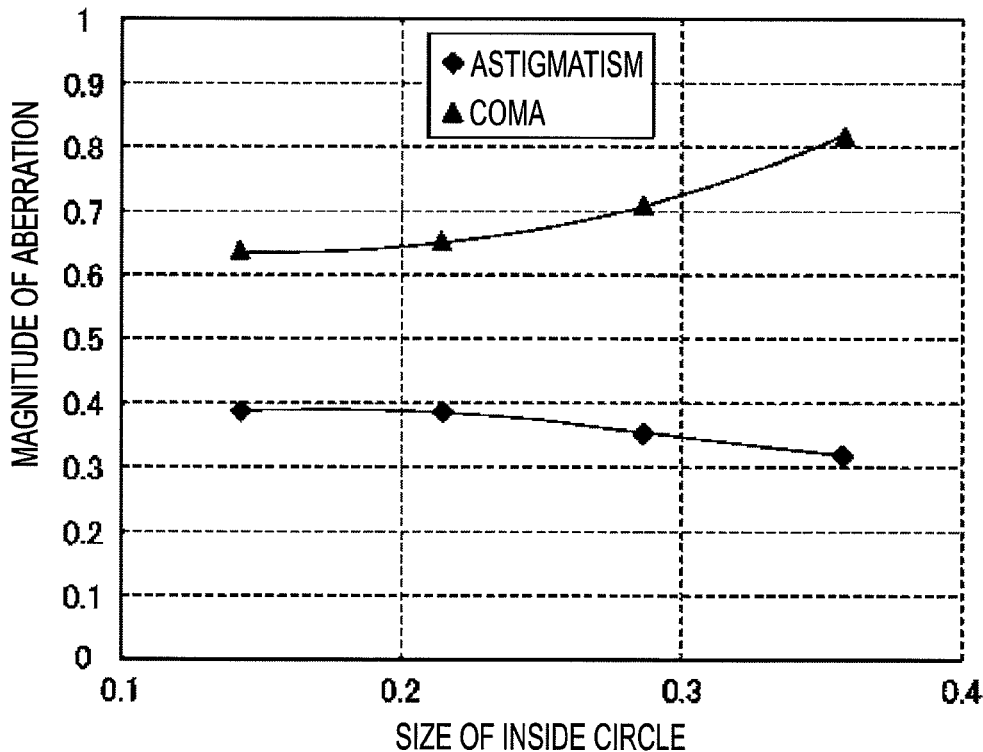
FIG. 7 shows an exemplary relationship between the size of a first circular division line and the magnitude of each of coma and astigmatism.

FIG. 7 shows a relationship between the size of the first circular division line 23 (inside circle) and the magnitude of each of coma and astigmatism. The size of the inside circle is normalized by the diameter of the effective range of a light beam. As the size of the inside circle varies 0.15 to 0.37, the astigmatism decreases while the coma increases. Sufficient correction effects can be attained by setting the size of the inside circle approximately equal to 0.2.

Changing the sizes of the first circular division line 23 (inside circle) and the second circular division line 24 (outside circle) can change the coma/astigmatism correction ratio according to the characteristics of the optical head 2 and allowable values of coma and astigmatism of the optical disc apparatus 1.

Figure 8:
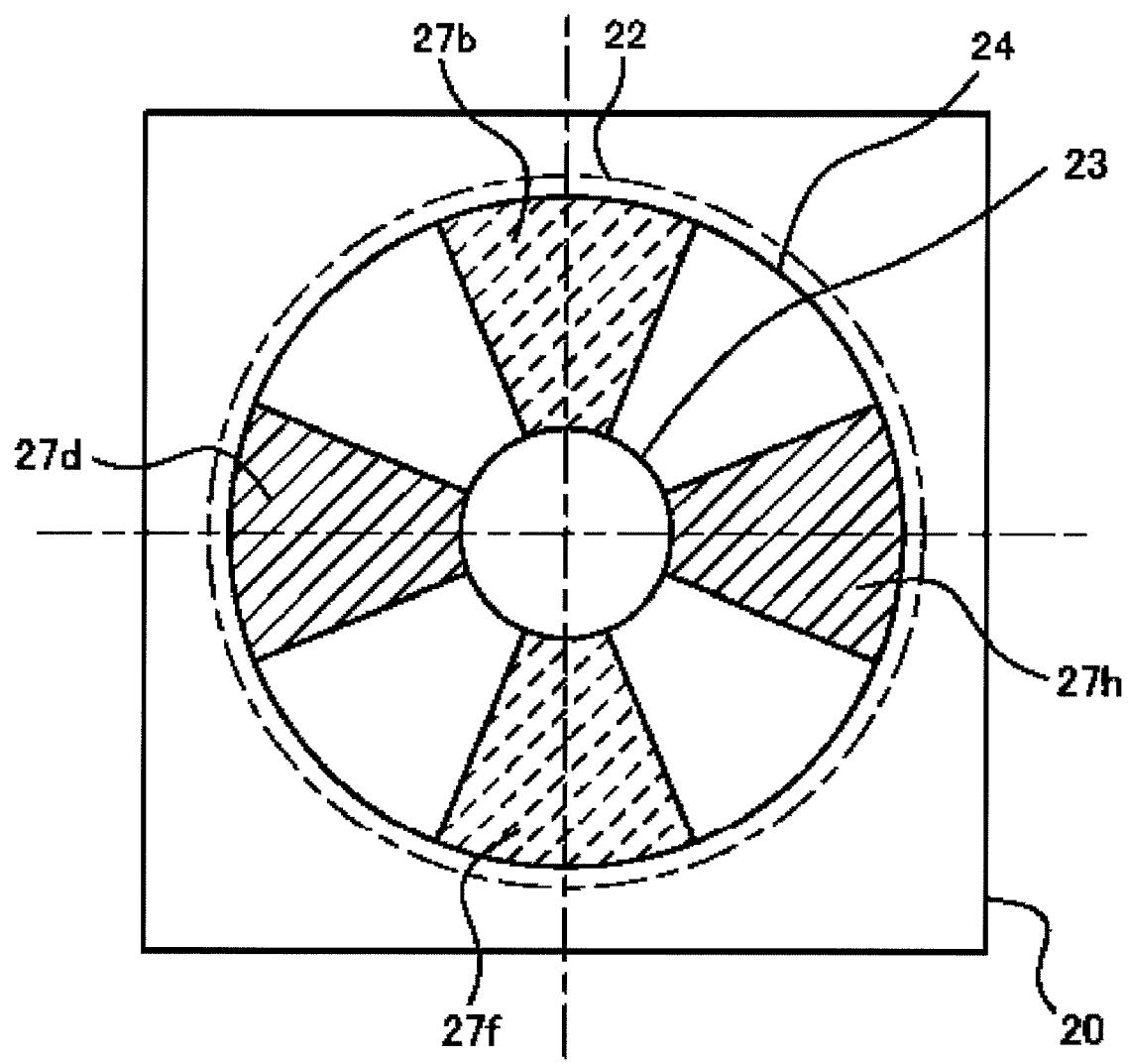
FIG. 8 shows exemplary drive patterns of the second transparent electrode to be employed in correcting astigmatism in the radial axis direction and the tangential axis direction.

FIG. 8 shows drive patterns of the second transparent electrode 20 to be employed in correcting the astigmatism in the radial axis direction and the tangential axis direction. Electric fields are applied to the divisional patterns 27b, 27d, 27f, and 27h among the divisional patterns 27a-27h of the second transparent electrode 20 shown in FIG. 4. Since the astigmatism is point-symmetrical with respect to the center point on the optical axis, the electric fields applied to the divisional patterns 27b and 27f are in the same direction and the electric fields applied to the divisional patterns 27d and 27h are in the direction opposite to those applied to the divisional patterns 27b and 27f. The size of the first circular division line 23 (inside circle) shown in FIG. 8 is about 0.25 and the size of the second circular division line 24 (outside circle) is about 0.95.

Figure 9:
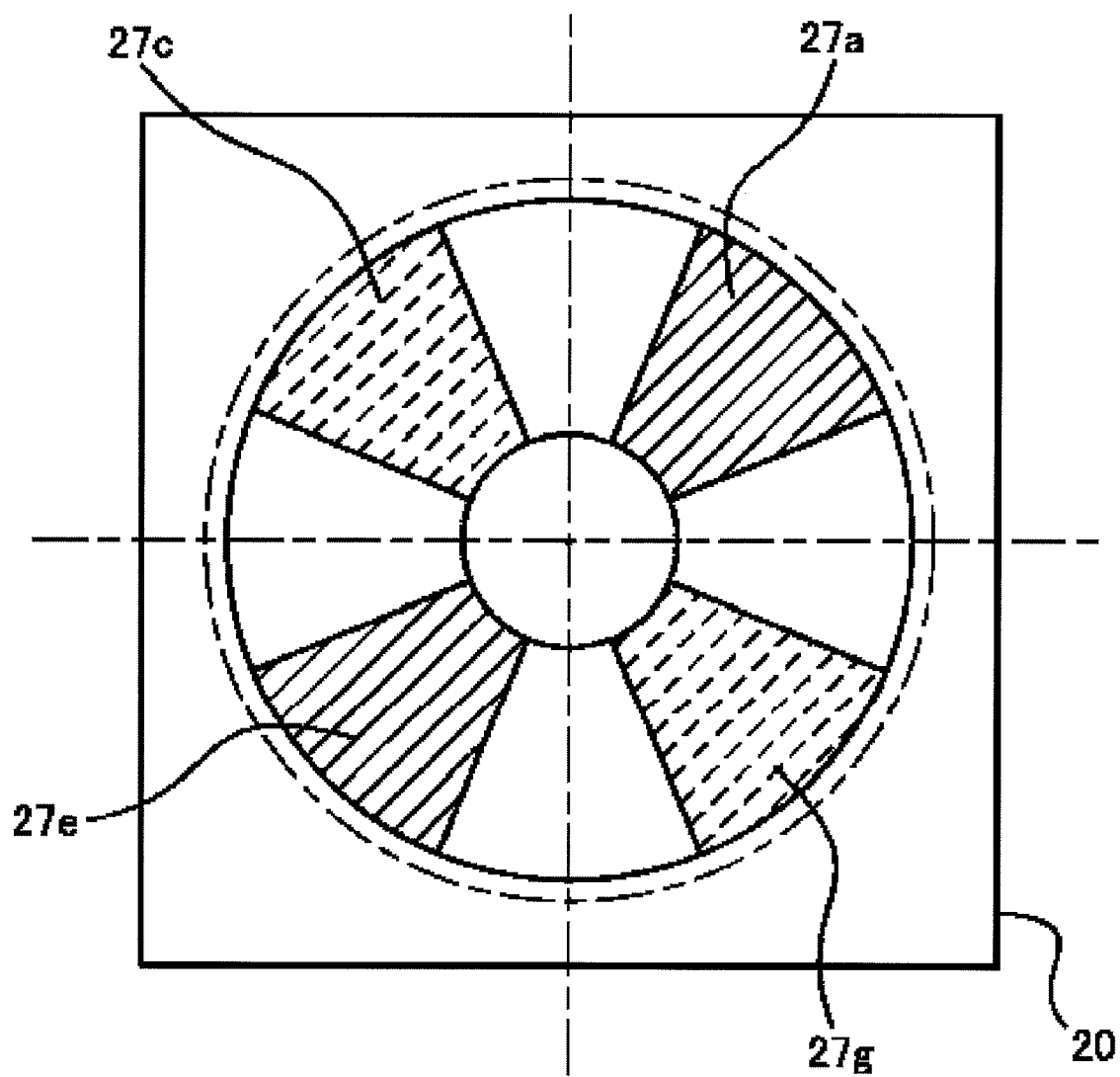
FIG. 9 shows exemplary drive patterns of the second transparent electrode to be employed in correcting astigmatism in the directions that form 45° with the radial axis and the tangential axis.

FIG. 9 shows drive patterns of the second transparent electrode 20 to be employed in correcting the astigmatism in the directions that form 45° with the radial axis and the tangential axis. Electric fields are applied to the divisional patterns 27a, 27c, 27e, and 27g among the divisional patterns 27a-27h of the second transparent electrode 20 shown in FIG. 4. Since the astigmatism is point-symmetrical with respect to the center point on the optical axis, the electric fields applied to the divisional patterns 27a and 27e are in the same direction and the electric fields applied to the divisional patterns 27c and 27g are in the direction opposite to those applied to the divisional patterns 27a and 27e. The first circular division line 23

(inside circle) and the second circular division line 24 (outside circle) shown in FIG. 9 are the same in size as those shown in FIG. 8.

Figure 10:
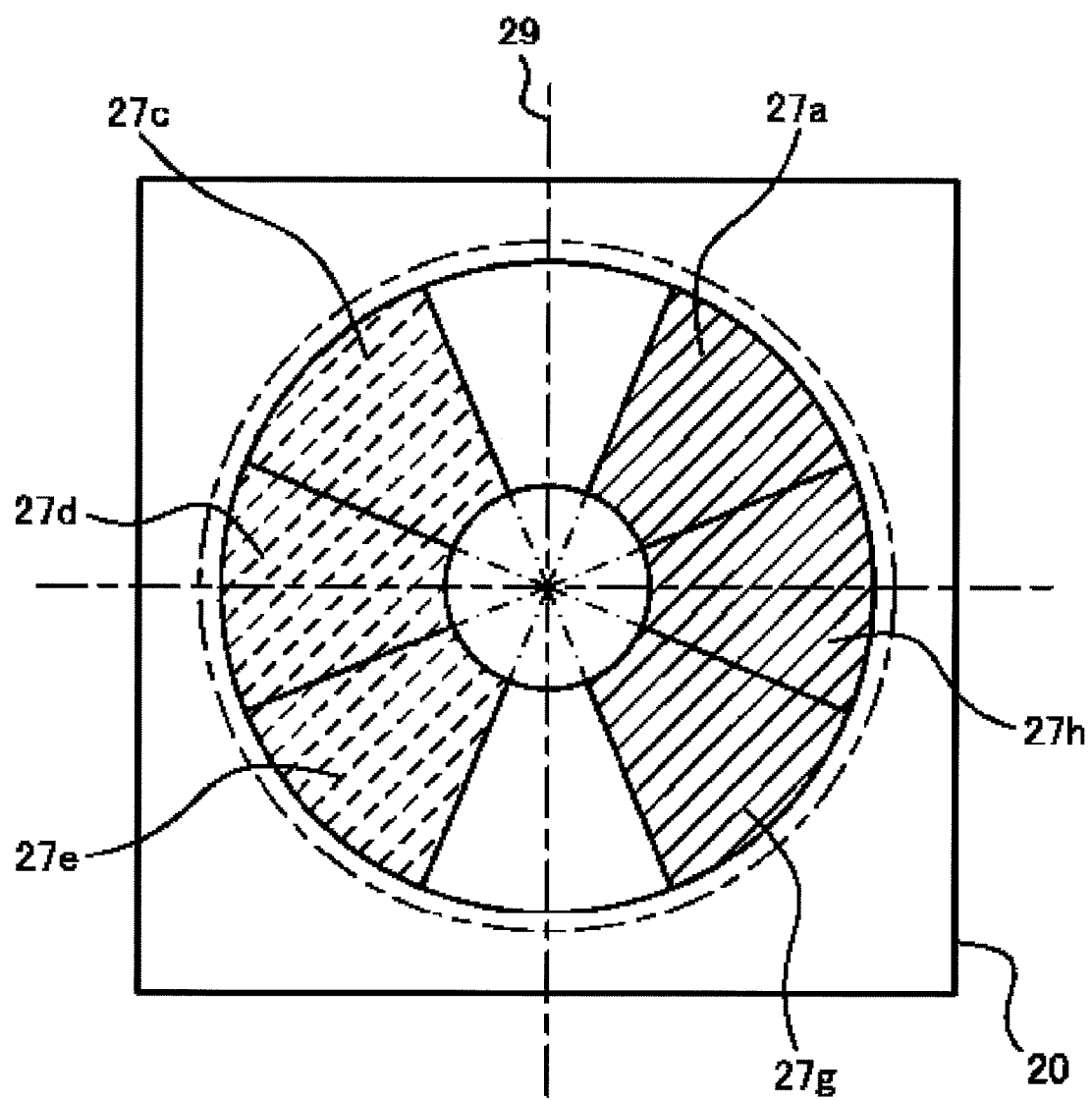
FIG. 10 shows exemplary drive patterns of the second transparent electrode to be employed in correcting coma in the radial direction.

FIG. 10 shows drive patterns of the second transparent electrode 20 to be employed in correcting the coma in the radial direction. Electric fields are applied to the divisional patterns 27a, 27c, 27d, 27e, 27g, and 27h among the divisional patterns 27a-27h of the second transparent electrode 20 shown in FIG. 4. Since as shown in FIG. 5B the coma in the radial direction is symmetrical with respect to the tangential axis, the electric fields applied to the divisional patterns 27a, 28g, and 27h are in the same direction and the electric fields applied to the divisional patterns 27c, 27d, and 27e are in the direction opposite to those applied to the divisional patterns 27a, 28g, and 27h. The first circular division line 23 (inside circle) and the second circular division line 24 (outside circle) shown in FIG. 10 are the same in size as those shown in FIG. 8.

Figure 11:
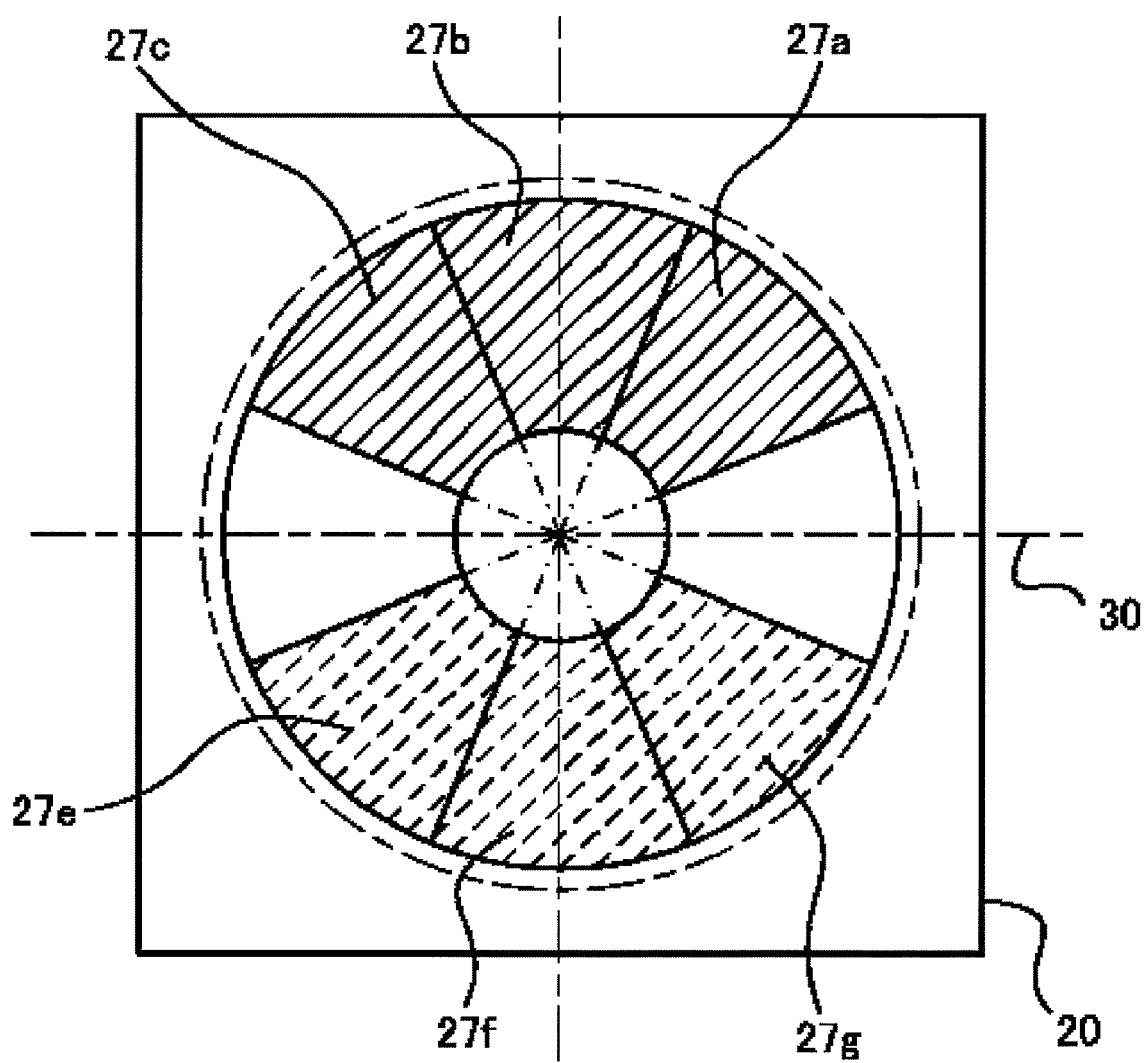
FIG. 11 shows exemplary drive patterns of the second transparent electrode to be employed in correcting coma in the tangential direction.

FIG. 11 shows drive patterns of the second transparent electrode 20 to be employed in correcting the coma in the tangential direction. Electric fields are applied to the divisional patterns 27a, 27b, 27c, 27e, 27f, and 27g among the divisional patterns 27a-27h of the second transparent electrode 20 shown in FIG. 4. Since the coma in the tangential direction is symmetrical with respect to the radial axis, the electric fields applied to the divisional patterns 27a, 28b, and 27c are in the same direction and the electric fields applied to the divisional patterns 27e, 27f, and 27g are in the direction opposite to those applied to the divisional patterns 27a, 28b, and 27c. The first circular division line 23 (inside circle) and the second circular division line 24 (outside circle) shown in FIG. 11 are the same in size as those shown in FIG. 8.

As described above, the first circular division line 23 is formed around the center of the second transparent electrode 20 and the second circular division line 24 is formed outside the first circular division line 23 so as to be concentric with it. And the region between the first circular division line 23 and the second circular division line 24 is divided radially by plural division lines that are arranged approximately at regular angular intervals; for example, the region is divided by the eight division lines 25a-25h. As a result, the second transparent electrode 20 can correct both of coma in the tangential direction and coma in the radial direction that are orthogonal to each other as well as both of astigmatism in the radial axis direction and the tangential axis direction and astigmatism in the directions that form 45° with the radial axis and the tangential axis.

The invention is not limited to the above embodiment and various modifications are possible.

As describe with reference to the above embodiment, there is provided an aberration correcting device capable of correcting coma and astigmatism efficiently with a single transparent electrode surface, as well as an optical head and an optical disk apparatus using the aberration correcting device.

The above embodiment makes it possible to correct coma and astigmatism efficiently with a single transparent electrode surface.

What is claimed is:

1. An aberration correcting device configured to simultaneously correct a coma and an astigmatism of a laser light emitted from a semiconductor laser, the aberration correcting device comprising:
   a liquid crystal layer configured to vary in a refractive index in accordance with an electric field applied thereto; and
   a pair of transparent electrodes disposed to sandwich the liquid crystal layer, wherein, at least one of the pair of transparent electrodes includes
   a first circular dividing line substantially centrally disposed and
   a second circular dividing line disposed outside the first circular dividing line and substantially concentrically arranged therewith, wherein a region between the first circular dividing line and the second circular dividing line is radially divided by eight dividing lines at substantially regular intervals, and wherein a diameter of the first circular dividing line ranges from 0.2 to 0.35 while a diameter of the second circular dividing line ranges from 0.85 to 1 when assuming an effective-range diameter of the laser light as 1.

2. An optical head comprising:
an objective lens configured to focus a laser light emitted from a semiconductor laser onto an optical disc and to receive a return laser light reflected from the optical disc; and
an aberration correcting device configured to simultaneously correct a coma and an astigmatism of the laser light emitted from the semiconductor laser, the aberration correcting device comprising:
   a liquid crystal layer disposed on an optical path between the semiconductor laser and the objective lens and configured to vary in a refractive index in accordance with an electric field applied thereto; and
   a pair of transparent electrodes disposed to sandwich the liquid crystal layer, wherein at least one of the pair of transparent electrodes includes
   a first circular dividing line substantially centrally disposed and
   a second circular dividing line disposed outside the first circular dividing line and substantially concentrically arranged therewith, wherein a region between the first circular dividing line and the second circular dividing line is radially divided by eight dividing lines at substantially regular intervals, and wherein, a diameter of the first circular dividing line ranges from 0.2 to 0.35 while a diameter of the second circular dividing line ranges from 0.85 to 1 when assuming an effective-range diameter of the laser light as 1.

3. An optical disc apparatus comprising:
an optical head comprising:
an objective lens configured to focus a laser light emitted from a semiconductor laser onto an optical disc and to receive a return laser light reflected from the optical disc;
an aberration correcting device configured to simultaneously correct a coma and an astigmatism of the laser light emitted from the semiconductor laser, the aberration correcting device comprising:
   a liquid crystal layer disposed on an optical path between the semiconductor laser and the objective lens and configured to vary in a refractive index in accordance with an electric field applied thereto; and
   a pair of transparent electrodes disposed to sandwich the liquid crystal layer; and
a computing circuit configured to compute a reproduction signal of information of the optical disc based on an output from a photo detector of the optical head, wherein, at least one of the pair of transparent electrodes includes
   a first circular dividing line substantially centrally disposed and
   a second circular dividing line disposed outside the first circular dividing line and substantially concentrically arranged therewith, wherein a region between the first circular dividing line and the second circular dividing line is radially divided by eight dividing lines at substantially regular intervals, and wherein, a diameter of the first circular dividing line ranges from 0.2 to 0.35 while a diameter of the second circular dividing line ranges from 0.85 to 1 when assuming an effective-range diameter of the laser light as 1.

* * * * *